United States Patent
Kim et al.

(10) Patent No.: US 8,948,404 B2
(45) Date of Patent: Feb. 3, 2015

(54) APPARATUS AND METHOD ENCODING/DECODING WITH PHASE INFORMATION AND RESIDUAL INFORMATION

(75) Inventors: Jung Hoe Kim, Hwaseong-si (KR); Eun Mi Oh, Gangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 12/926,054

(22) Filed: Oct. 22, 2010

(65) Prior Publication Data

US 2011/0103592 A1 May 5, 2011

Related U.S. Application Data

(60) Provisional application No. 61/254,419, filed on Oct. 23, 2009.

(30) Foreign Application Priority Data

Sep. 7, 2010 (KR) ........................ 10-2010-0087613

(51) Int. Cl.
*H04R 5/00* (2006.01)
*G10L 19/008* (2013.01)
(Continued)

(52) U.S. Cl.
CPC ............... *G10L 19/008* (2013.01); *G10L 19/12* (2013.01); *H04N 21/4382* (2013.01)
USPC ................. 381/22; 381/23; 381/61; 381/119; 704/200; 704/500

(58) Field of Classification Search
CPC ....... G10L 19/008; G10L 19/24; G10L 19/02; G10L 21/0208; G10L 19/167; G10L 19/00; G10L 19/005; G10L 19/04; G10L 19/0017; G10L 19/18; G10L 25/18; G10L 21/0205; H04R 3/005; H04R 3/12; H04R 25/407
USPC ......... 381/1, 2, 15, 16, 17, 18, 19, 20, 21, 22, 381/23, 309, 310, 311, 26, 61, 86, 91, 92, 381/94.2, 94.3, 94.4, 97, 98, 103, 119, 122; 704/200, 203, 205, 500, 501, 503, 504, 704/E19.01, E19.042, E19.048, 230; 34/1, 34/2, 15, 16, 17, 18, 19, 20, 21, 22, 23, 34/309, 310, 311, 26, 61, 86, 91, 92, 94.2, 34/94.3, 94.4, 97, 98, 103, 119, 122; 341/50; 700/94
See application file for complete search history.

(56) References Cited

U.S. PATENT DOCUMENTS

2006/0190247 A1* 8/2006 Lindblom ...................... 704/230
2006/0233379 A1* 10/2006 Villemoes et al. .............. 381/23
2007/0127729 A1 6/2007 Breebaart et al.
(Continued)

FOREIGN PATENT DOCUMENTS

EP 1944758 A2 7/2008

OTHER PUBLICATIONS

Heiko Purnhagen et al., "Core experiment on Unified Stereo Coding for USAC", International Organisation for Standaradisation Organisation Internationale De Normalisation ISO/IEC JTC1/SC29/WG11 Coding of Moving Pictures and Audio, MPEG2009/M16664, Jun. 2009, 5 pp.

(Continued)

*Primary Examiner* — Leshui Zhang
(74) *Attorney, Agent, or Firm* — Staas & Halsey LLP

(57) ABSTRACT

Provided is an apparatus and method of encoding and decoding multiple channel signals based upon phase information and one or more residual signals.

9 Claims, 7 Drawing Sheets

(51) Int. Cl.
*G10L 19/12* (2013.01)
*H04N 21/438* (2011.01)

(56) References Cited

U.S. PATENT DOCUMENTS

| | | | |
|---|---|---|---|
| 2007/0194952 A1* | 8/2007 | Breebaart et al. | ............... 341/50 |
| 2008/0312912 A1 | 12/2008 | Choo et al. | |
| 2009/0083040 A1 | 3/2009 | Myburg et al. | |
| 2009/0262945 A1 | 10/2009 | Teo et al. | |

OTHER PUBLICATIONS

Jürgen Herre et al., "MPEG Surround—The ISO/MPEG Standard for Efficient and Compatible Multichannel Audio Coding", Journal of the Audio Engineering Society, vol. 56, No. 11, Nov. 2008, pp. 932-955.

Extended European Search Report mailed Aug. 9, 2013 in related European Application No. 10825241.2.

Chinese Office Action issued Jun. 5, 2014 in corresponding Chinese Patent Application 201080047876.1.

JungHoe Kim et al., "Enhanced Stereo Coding with phase parameters for MPEG Unified Speech and Audio Coding", Audio Engineering Society, 127$^{th}$ AES Convention, Oct. 9-12, 2009, pp. 1-7.

Japanese Office Action mailed Apr. 22, 2014 in related Japanese Application No. 2012-535143.

* cited by examiner

APPARATUS AND METHOD ENCODING/DECODING WITH PHASE INFORMATION AND RESIDUAL INFORMATION

CROSS-REFERENCE TO RELATED APPLICATIONS

This application claims the benefit under 35 U.S.C. §119 of U.S. Provisional Application No. 61/254,419, filed on Oct. 23, 2009, in the U.S. Patent and Trademark Office, and the benefit under 35 U.S.C. §119 of Korean Patent Application No. 10-2010-0087613, filed on Sep. 7, 2010, in the Korean Intellectual Property Office, the entire disclosures of which are incorporated herein by reference.

BACKGROUND

1. Field

One or more embodiments relate to an encoding apparatus and a decoding apparatus for encoding and decoding multiple channel signals, and one or more methods thereof, and more particular, to an encoding apparatus and a decoding apparatus for encoding and decoding multiple channel signals based on phase information and a residual signal, and one or more methods thereof.

2. Description of the Related Art

In general, a multi-channel audio coding may include a waveform multi-channel audio coding and a parametric multi-channel audio coding. As only examples of the waveform multi-channel audio coding, a Moving Picture Experts Group (MPEG)-2 motion compensation (MC) audio coding, an advanced audio coding (AAC) MC audio coding, a bit sliced arithmetic coding/application visualization system (BSAC/AVS) MC audio coding, and the like may be used. As only an example, a waveform multi-channel audio coding may output from a decoder five channel signals from a transmitted single or stereo encoded signal based on five channel signals input to an original encoder, noting that stereo or 7 channel signals, as well as alternative channel signal numbers, are equally available.

For example, the parametric multi-channel audio coding may include an MPEG surround coding, and output one or two input channels for representing six or eight multiple channels, e.g., after up-mixing of the transmitted one or two channels, for example.

Using an exemplary arrangement, encoding a mono or stereo signal, a parametric stereo (PS) technology may be used. Again, the parametric stereo technology may down-mix an input stereo signal to generate a mono signal, extract a stereo parameter indicating side information for the stereo signal, and encode the stereo signal by encoding the generated mono signal and the extracted stereo parameter. The decoder may then up-mix the decoded mono signal based on the decoded stereo parameter.

As examples of the stereo parameter used in this case, Inter-channel Intensity Difference (IID) or channel level differences (CLD) indicating an intensity difference based on an energy level of at least two channel signals included in the stereo signal, Inter-channel Coherence (ICC) or Inter-channel Correlation (ICC) indicating a correlation degree between two channel signals based on similarity of waveforms of the at least two channel signals included in the stereo signal, Inter-channel Phase Difference (IPD) indicating a phase difference between the at least two channel signals included in the stereo signal, Overall Phase Difference (OPD) indicating how a phase difference between the at least two channel signals is distributed based on the mono signal, and the like may be given.

Here, the parametric stereo technology may be expanded for the purpose of encoding multiple channels, i.e., plural mono or stereo signals can be hierarchically be generated and respective parameter information for each level of down-mixing can be produced. For a single layer of up-mixing, an MPEG surround technology may perform an up-mixing of an encoded mono or stereo signal to multiple channels based on a 1-to-2 (One-to-Two, OTT) module and a 2-3 (Two to Three, TTT) module, for example. As noted, and only as an example, plural such modules can be performed in a hierarchical manner, e.g., as a tree structure, so 5 or more input multiple signals can eventually be down-mixed to a single mono or stereo signal, and then eventually up-mixed into multiple signals greater than the encoded single mono or stereo signal. For example, five or seven multiple signals can be down-mixed by an encoder to one mono or stereo signal and eventually up-mixed back into the five or seven multiple signals by a decoder.

When the MPEG surround coding scheme codes the multiple channel signals by expressing the multiple channel signals with parameters, the multiple channel signals incorrectly decode all original signals from the respective parameter(s), even when a bit rate is increased, i.e., respective parameters may not provide sufficiently accurate information for an adequate decoding from a down-mixed signal(s) back into the up-mixed multiple channels signals. Therefore, the present inventors have found a desire for a method of decoding the multiple channel signals to be as close to the original signals when the multiple channel signals are expressed by parameters.

SUMMARY

According to an aspect of one or more embodiments, there may be provided an encoding apparatus, including a parameter encoder to extract one or more spatial parameters associated with phase information of N channel signals, and to encode the extracted one or more spatial parameters, a down-mixing unit to down-mix the N channel signals into M channel signals based on the extracted one or more spatial parameters, a residual signal encoder to encode a residual signal associated with the N channel signals based on the down-mixed M channel signals, a channel signal encoder to encode the M channel signals, and an output to output the encoded residual signal and the encoded M channel signals.

Here, N may be equal to 2 and M equal to 1.

The residual signal encoder may extract the residual signal as an error signal generated when the N channel signals are compared to one or more channel signals expressed based on the extracted one or more spatial parameters.

A multiple channel signal of at least 5 channels signals may be encoded through a hierarchical down-mixing through plural two-to-one (TTO) down-mixing modules, and the encoding apparatus may include at least one of the TTO down-mixing modules including the parameter encoder and the down-mixing unit, and the encoding apparatus outputting the encoded residual signal and encoded M channel signals such that the output encoded residual signal and output encoded M channel signals are usable through plural up-mixing to reproduce the at least 5 channels.

According to an aspect of one or more embodiments, there may be provided a decoding apparatus, including a channel signal decoder to decode encoded M channel signals from a bitstream, based on at least one of an Algebraic Code Excited Linear Predication (ACELP), weighted Linear Predictive Transform (wLPT), and an advanced audio coding (AAC), a parameter decoder to decode at least one encoded spatial parameter for the encoded M channel signals, a phase information estimating unit to estimate phase information based on the at least one decoded spatial parameter, a residual signal decoder to decode an encoded residual signal for the encoded M channel signals, a matrix calculator to calculate an up-mixing matrix for up-mixing the decoded M channel signals, based on the estimated phase information, and an up-mixing unit to up-mix the decoded M channel signals into N channel signals, based on the decoded residual signal and the up-mix matrix.

Here, the at least one decoded spatial parameter may include at least one of a channel level difference (CLD) and an inter-channel phase difference (IPD), with the CLD indicating an intensity difference based on energy levels of the N channel signals and the IPD indicating a phase difference between the N channel signals, and the phase information estimating unit estimates an overall phase difference (OPD) based on the at least one decoded spatial parameter, with the OPD indicating a degree of distribution, in the decoded M channel signals, of one or more phase differences between the N channel signals.

The residual signal may be an error signal generated based on a comparison between the N channel signals and one or more channel signals expressed based on the at least one spatial parameter.

Here, N may be equal to 2 and M may equal to 1.

A multiple channel signal of at least 5 channel signals may be decoded through a hierarchical up-mixing through plural one-to-two (OTT) up-mixing modules, and the decoding apparatus may include at least one of the OTT up-mixing modules including the up-mixing unit such that the decoded N channel signals are usable to reproduce the at least 5 channels through additional OTT up-mixing of the N channel signals.

According to an aspect of one or more embodiments, there may be provided a decoding apparatus, including a channel signal decoder to decode encoded M channel signals encoded in a Moving Picture Experts Group Unified Speech and Audio Coder (MPEG USAC), based on at least one of an Algebraic Code Excited Linear Predication (ACELP) based on an operating Linear Predication Domain (LPD), a weighted Linear Predictive Transform (wLPT), and an advanced audio coding (AAC) based on a Frequency Domain (FD), a parameter decoder to decode one or more encoded spatial parameters for the encoded M channel signals, a phase information estimating unit to estimate phase information based on the decoded one or more spatial parameters, a residual signal decoder to decode an encoded residual signal for the encoded M channel signals, a matrix calculator to calculate an up-mixing matrix for the decoded M channel signals based on the estimated phase information, and an up-mixing unit to up-mix the decoded M channel signals into N channel signals, based on the decoded residual signal and the up-mixing matrix.

According to an aspect of one or more embodiments, there may be provided an encoding method, including extracting one or more spatial parameters associated with phase information of N channel signals and to encode the extracted one or more spatial parameters, down-mixing the N channel signals into M channel signals, based on the extracted one or more spatial parameters, encoding a residual signal associated with the N channel signals based on the down-mixed M channel signals, encoding the M channel signals, and outputting the encoded residual signal and the encoded M channel signals.

Here, N may be equal to 2 and M may be equal to 1.

The encoding of the residual signal may include extracting the residual signal as an error signal generated when the N channel signals are compared to one or more channel signals expressed by the extracted one or more spatial parameters.

A multiple channel signal of at least 5 channels signals may be encoded through a hierarchical down-mixing through plural two-to-one (TTO) down-mixing modules, the encoding apparatus including at least one of the TTO down-mixing modules performing the parameter extracting and the down-mixing of the N channel signals into the M channel signals, and the outputting further includes outputting the encoded residual signal and encoded M channel signals such that the output encoded residual signal and output encoded M channel signals are usable through plural up-mixing to reproduce the at least 5 channels.

According to an aspect of one or more embodiments, there may be provided a decoding method, including decoding encoded M channel signals from a bitstream, decoding at least one encoded spatial parameter for the encoded M channels signals, estimating phase information based on the at least one decoded spatial parameter, decoding an encoded residual signal for the encoded M channels, calculating an up-mixing matrix for up-mixing the decoded M channel signals, based on the estimated phase information, and up-mixing the decoded M channel signals into N channel signals, based on the decoded residual signal and the up-mixing matrix.

The decoded at least one spatial parameter may include at least one of a channel level difference (CLD) and an inter-channel phase difference (IPD), with the CLD indicating an intensity difference based on energy levels of the N channel signals and the IPD indicating a phase difference between the N channel signals, and the estimating may include estimating an overall phase difference (OPD) based on the decoded at least one spatial parameter, with the OPD indicating a degree of distribution, in the decoded M channel signals, of one or more phase differences between the N channel signals.

Here, N may be equal to 2 and M may be equal to 1.

The residual signal may be an error signal generated based on a comparison between the N channel signals and one or more channel signals expressed based on the at least one spatial parameter.

A multiple channel signal of at least 5 channel signals may be decoded through a hierarchical up-mixing through plural one-to-two (OTT) up-mixing operations, the decoding method including at least one of the OTT up-mixing operations including the up-mixing of the decoded M channel signals into the N channel signals such that the decoded N channel signals are usable to reproduce the at least 5 channels through additional OTT up-mixing of the N channel signals.

According to an aspect of one or more embodiments, there may be provided a decoding method, including decoding encoded M channel signals encoded in an Moving Picture Experts Group Unified Speech and Audio Coder (MPEG USAC), based on at least one of an Algebraic Code Excited Linear Predication (ACELP) based on an Linear. Predication Domain (LPD), a weighted Linear Predictive Transform (wLPT), and an advanced audio coding (AAC) based on a Frequency Domain (FD), decoding at least one encoded spatial parameter for the encoded M channel signals, estimating phase information based on the decoded at least one spatial parameter, decoding an encoded residual signal for the encoded M channels signals, calculating an up-mixing matrix for the decoded M channel signals, based on the estimated phase information, and up-mixing the decoded M channel signals into N channel signals, based on the decoded residual signal and the up-mixing matrix.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
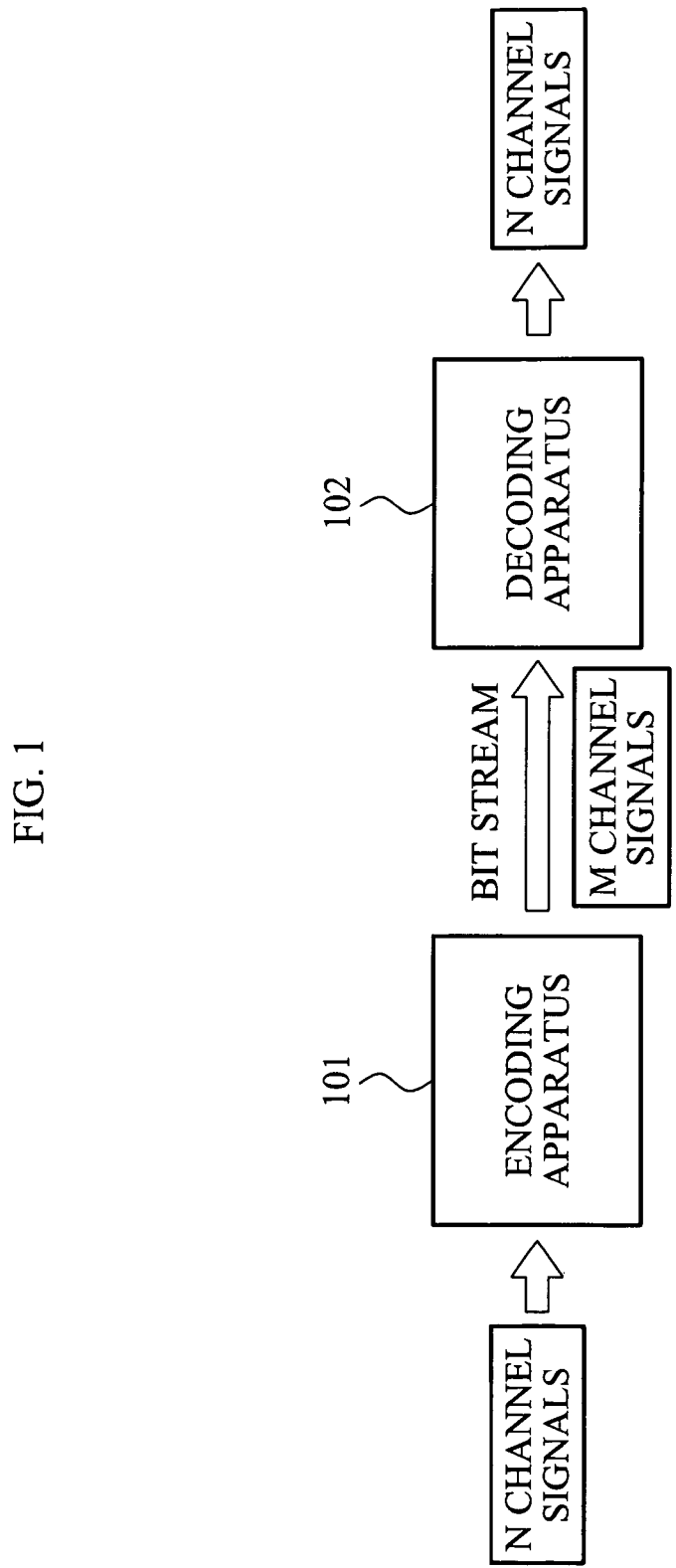
FIG. 1 is a diagram illustrating a system including an encoding apparatus and a decoding apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

According to one or more embodiments, a down-mixed channel signal may be restored to be as close to an original signal by up-mixing the down-mixed channel signal, based on phase information and a residual signal.

FIG. 1 illustrates an encoding apparatus 101 and a decoding apparatus 102, according to one or more embodiments.

Referring to FIG. 1, the encoding apparatus 101 may output M encoded channel signals obtained by down-mixing N input channel signals. In an embodiment, N is greater than M. For example, when a stereo signal including two channel signals is input to the encoding apparatus 101, the encoding apparatus 101 may down-mix the stereo signal into a mono signal including a single channel signal, and may encode the mono signal. Here, in this embodiment, N has a value greater than or equal to '2', and M has a value greater than or equal to '1.' Herein, one or more embodiments may be discussed with regard to a single down-mixing or single down-mixing module, and a similar single up-mixing or single up-mixing module, but embodiments are not limited to the same and may also be available for plural levels of down-mixing and/or plural levels of up-mixing.

Regardless, the encoding apparatus 101 may extract a spatial parameter indicating a relationship between the input N channel signals, and may encode the extracted spatial parameter for down-mixing the input N channel signal. In this case, the spatial parameter may be associated with phase information that the decoding apparatus 102 thereafter estimates. The encoding apparatus 101 may extract a residual signal that is an error signal generated when the input N channel signals are expressed by one or more spatial parameters, and may encode the extracted residual signal. In one or more embodiments, the expression of the N channel signals by the spatial parameters may actually include an up-mixing operation to decode the down-mixed M channel signals, and the residual signal may be an error signal representing the error between the up-mixed N channel signals and the original N channel signals. Thus, the encoding apparatus 101 may output encoded M channel signals, one or more spatial parameters, and the residual signal, and may further transmit the encoded M channels signals, the encoded spatial parameter, and the encoded residual signal to the decoding apparatus 102 through a bit stream, as only an example.

The decoding apparatus 102 may decode the encoded residual signal and the encoded one or more spatial parameters included in the bit stream. The decoding apparatus 102 may thereby calculate an up-mixing matrix based on estimated phase information derived from the decoded one or more spatial parameters. The decoding apparatus 102 may then up-mix the transmitted M channel signals based on the calculated up-mixing matrix and the transmitted residual signal to restore and output the decoded N channel signals.

The decoding apparatus 102 may accordingly output decoded N channel signals that are substantially similar to the original N channel signals input to the encoding apparatus 101, based on the residual signal and the estimated phase information. Again, the phase information may be estimated based on one or more decoded spatial parameters indicating the decoded relationship between the N channel signals.

Figure 2:
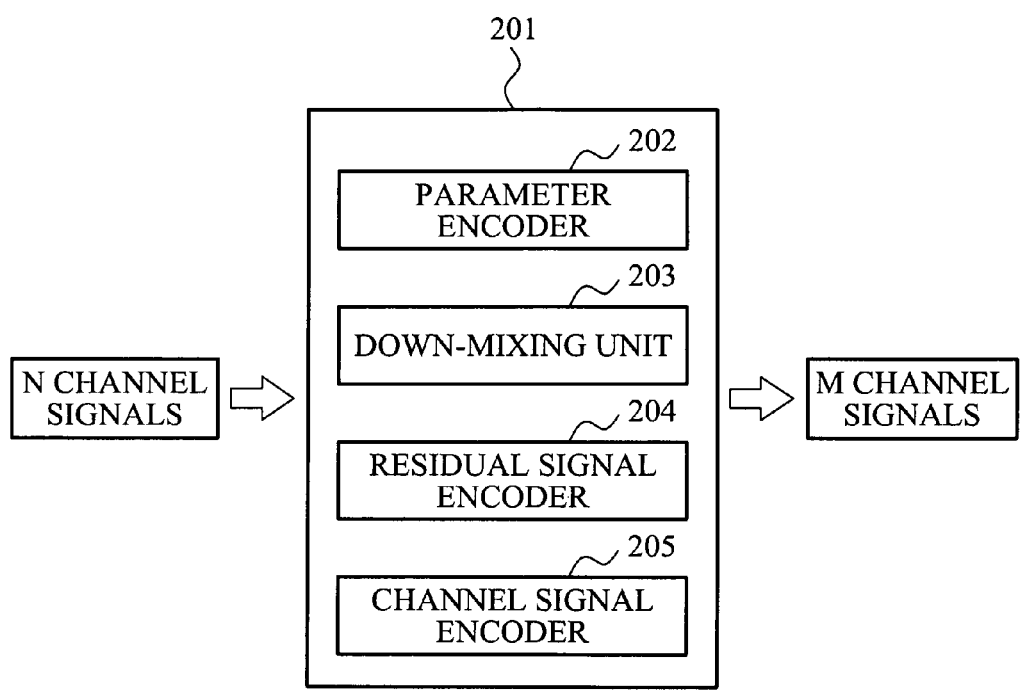
FIG. 2 is a block diagram illustrating a configuration of an encoding apparatus, according to one or more embodiments.

FIG. 2 illustrates a configuration of an encoding apparatus 201, according to one or more embodiments.

Referring to FIG. 2, the encoding apparatus 201 may include a parameter encoder 202, a down-mixing unit 203, a residual signal encoder 204, and a channel signal encoder 205, for example.

The parameter encoder 202 may extract a spatial parameter associated with phase information of the input N channel signals and may encode the extracted spatial parameter. In an embodiment, when a stereo signal indicating two channel signals is input to the encoding apparatus 201, the parameter encoder 202 may extract a spatial parameter indicating a relationship between the respective left channel signal and a right channel signal, for example, and may encode the extracted spatial parameter.

As only an example, the parameter encoder 202 may transform the N channel signal into a sub-sample based on a quadrature mirror filter (QMF) analysis and Nyquist filterbank analysis, to extract the spatial parameter. The parameter encoder 202 may quantize the extracted spatial parameter and may perform lossless encoding the quantized spatial parameter.

In an embodiment, the spatial parameter may include an inter-channel intensity difference (IID) or channel level difference (CLD) indicating an intensity difference based on energy levels of the input N channel signals, an inter-channel coherence or inter-channel correlation (ICC) indicating a correlation based on a similarity of waveforms of the input N channel signals, or an inter-channel phase difference (IPD) indicating a phase difference between the input N channel signals. In this embodiment, when an input signal is a stereo signal including two channel signals, i.e., N equals 2, a spatial parameter may indicate the relationship between the two channel signals included in the stereo signal.

The down-mixing unit 203 may down-mix N channel signals into M channel signals based on the extracted spatial parameter. In an embodiment, N is greater than M. As only an example, the down-mixing unit 203 may down-mix a stereo signal into a mono signal. When N is 2, there may be an input stereo signal, and M may be 1 when only a mono signal is output.

The residual signal encoder 204 may encode the residual signal extracted based on the extracted one or more spatial parameters. As noted, the residual signal may indicate an error signal generated when the N channel signals are expressed by spatial parameters. In one or more embodiments, the residual signal may be encoded based on a Moving Picture Estimating Group advanced audio coding (MPEG AAC) scheme, using Modified Discrete Cosine Transform (MDCT), noting that alternative encoding approaches are also available.

The channel signal encoder 205 may encode the downmixed M channel signals. In one or more embodiments, the channel signal encoder 205 may transform the M channel signals into a QMF domain based on a Nyquist filterbank analysis, and a spectral bandwidth replication (SBR) encoding is performed. The channel signal encoder 205 may transform the M channel signals into a time domain based on a QMF synthesis, and may be core-encoded. In an embodiment, the core-encoding may be one or more of an Algebraic Code Excited Linear Predication (ACELP) based on an Linear Predication Domain (LPD) operated in a Moving Picture Experts Group Unified Speech and Audio Coder (MPEG USAC), a weighted Linear Predictive Transform (wLPT), and an advanced audio coding (AAC) based on a Frequency Domain (FD), as only examples.

Figure 3:
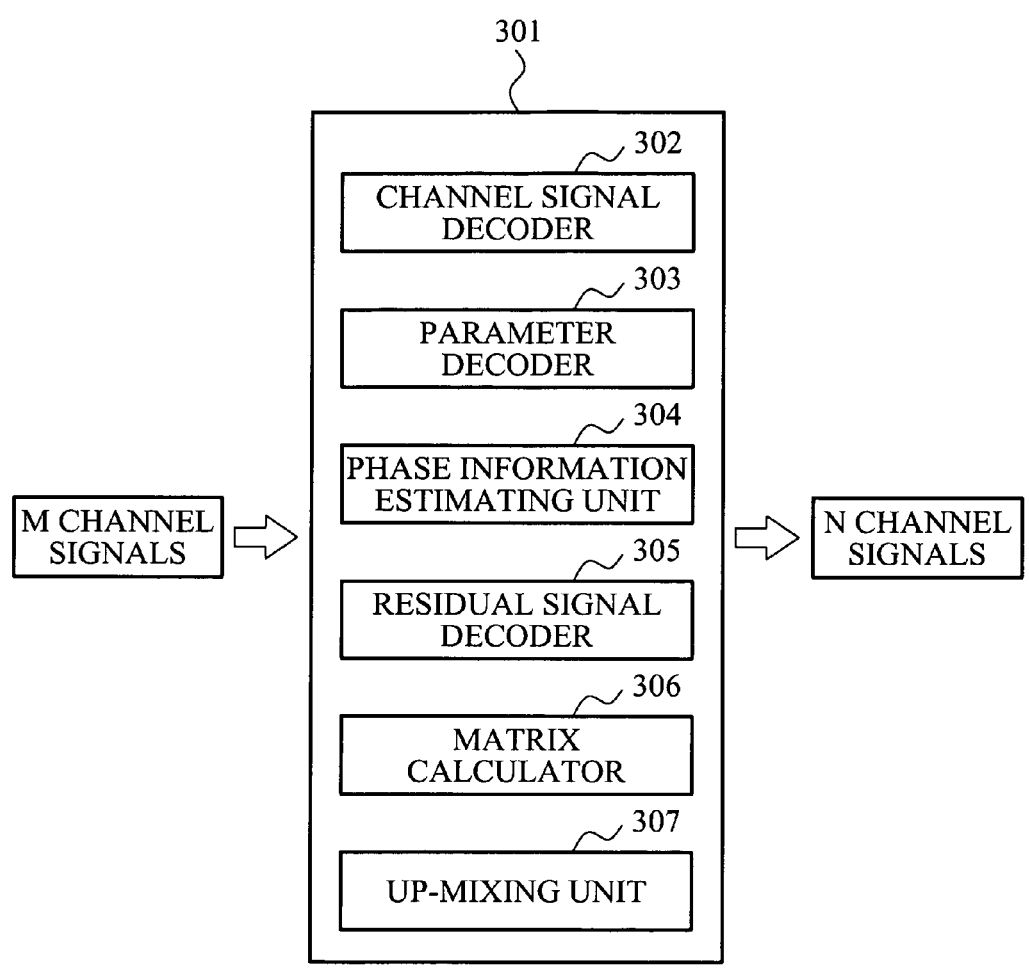
FIG. 3 is a block diagram illustrating a configuration of a decoding apparatus, according to one or more embodiments.

FIG. 3 illustrates a configuration of a decoding apparatus 301, according to one or more embodiments.

Referring to FIG. 3, the decoding apparatus 301 may include a channel signal decoder 302, a parameter decoder 303, a phase information estimating unit 304, a residual signal decoder 305, a matrix calculator 306, and an up-mixing unit 307, for example.

The channel signal decoder 302 may decode M encoded channel signals. In one or more embodiments, the channel signal decoder 302 may decode the encoded M channel signals from a bit stream, based on one or more of an ACELP based on a LPD operated in an MPEG USAC, a wLPT, and an AAC based on an FD, as only examples. The channel signal decoder 302 may transform, based on a QMF analysis, the decoded M channel signals into sub-band signals. The channel signal decoder 302 may spectral bandwidth replication (SBR) decode the M channel signals transformed into the sub-band signals. A Nyquist filterbank analysis may be applied to the SBR decoded M channel signals, for example.

The parameter decoder 303 may decode one or more encoded spatial parameters from the bit stream. In one or more embodiments, the spatial parameter may include one or more of an IID or CLD indicating an intensity difference based on energy levels of N channel signals, an ICC indicating a correlation based on a similarity of waveforms of the N channel signals, or an IPD indicating a phase difference between the N channel signals, for example.

The phase information estimating unit 304 may estimate phase information based on the one or more decoded spatial parameters. As only an example, the phase information estimating unit 304 may estimate an overall phase difference (OPD) based on a decoded spatial parameter, the OPD indicating a degree of distribution, in the decoded M channel signals, of a phase difference between the N channel signals.

The residual signal decoder 305 may decode an encoded residual signal. In an embodiment, the residual signal decoder 305 may decode the encoded residual signal from the bit stream, based on a modified discrete cosine transform (MDCT), for example. The residual signal decoder 305 may transform the decoded residual signal into a QMF domain. When the encoded residual signal is not included in the bit stream, the residual signal decoder 305 may generate a separate signal using a decorrelator included in, in an embodiment, the residual signal decoder 305, for example.

The matrix calculator 306 may calculate an up-mixing matrix with respect to the decoded M channel signals, based on the estimated phase information.

The up-mixing unit 307 may up-mix the decoded M channel signals into N channel signals, based on the decoded residual signal and the up-mixing matrix. As noted, when the encoded residual signal is not decoded, the up-mixing unit 307 may perform up-mixing based on a separate signal generated through a decorrelator. After the up-mixing, the N channel signals may be restored based on the Nyquist filterbank analysis and a QMF synthesis.

Figure 4:
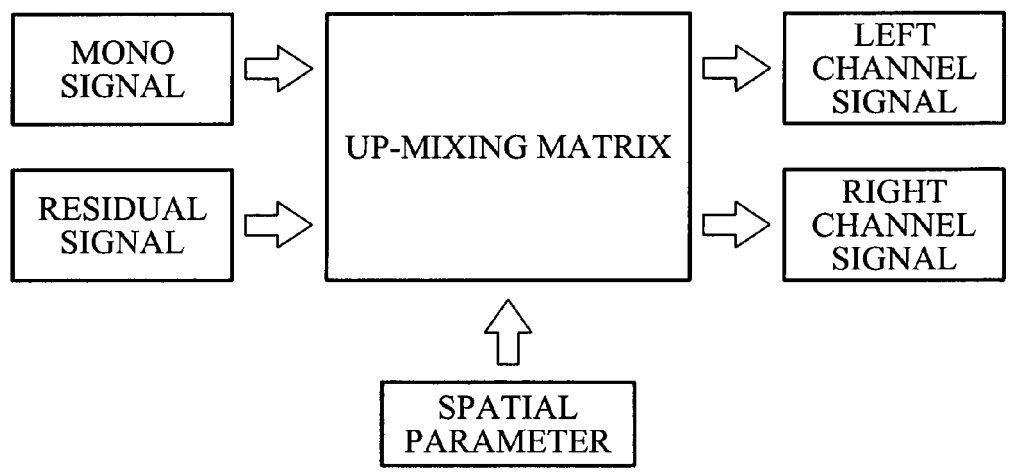
FIG. 4 is a diagram illustrating a process of calculating an up-mixing matrix, according to one or more embodiments.

FIG. 4 illustrates a process of calculating an up-mixing matrix, according to one or more embodiments.

Referring to FIG. 4, for merely ease of explanation, it will be assumed that an input signal is a mono signal (M=1) obtained by down-mixing a stereo signal (N=2), and an output signal of the decoding apparatus 301 will also be a stereo signal. Referring to FIG. 4, the matrix calculator 306 of the decoding apparatus 301 may calculate, based on estimated phase information, e.g., estimated using one or more decoded spatial parameters, an up-mixing matrix to up-mix the mono signal into the stereo signal including a left channel signal and a right channel signal. In one or more embodiments, the mono signal may indicate a single channel signal and the stereo signal may be two channel signals. The spatial parameter may indicate an OPD estimated based on an IPD and a CLD, noting that alternatives are also available.

The IPD with respect to the stereo signal may be determined based on the below Equation 1, for example.

$$IPD = \angle(L \cdot R) \quad \text{Equation 1:}$$

Here, $L \cdot R$ may denote a dot product between the left channel signal and the right channel signal, the IPD may denote an angle between the left channel signal and the right channel signal, and in one or more embodiments an included * may denote a complex conjugate.

The OPD with respect to the stereo signal may be determined based on the below Equation 2, for example.

$$OPD = \angle(L \cdot M) \quad \text{Equation 2:}$$

Here, the $L \cdot M$ may denote a dot product between the left channel signal and the mono signal, the OPD may denote an angle between the left channel signal and the mono signal, and in one or more embodiments an included * may denote a complex conjugate.

As only an example, the OPD may accordingly be expressed/estimated by the below Equation 3.

$$OPD_{left}^{l,m} = \quad \text{Equation 3}$$

$$\begin{cases} 0, & \text{if } (IPD^{l,m} == \pi \,\&\&\, CLD^{l,m} == 0) \\ \arctan\left(\dfrac{c_2^{l,m}\sin(IPD^{l,m})}{c_1^{l,m} + c_2^{l,m}\cos(IPD^{l,m})}\right), & \text{otherwise} \end{cases}$$

$$c_{1,b} = \sqrt{\dfrac{10^{\frac{CLD_b}{10}}}{1 + 10^{\frac{CLD_b}{10}}}},$$

$$c_{2,b} = \sqrt{\dfrac{1}{1 + 10^{\frac{CLD_b}{10}}}}$$

In one or more embodiments, the matrix calculator 306 may calculate an up-mixing matrix of the below Equation 4, for example, based on estimated OPD, such as according to Equation 3, for example.

$$\begin{bmatrix} H11_{OTT_X}^{l,m} & H12_{OTT_X}^{l,m} \\ H21_{OTT_X}^{l,m} & H22_{OTT_X}^{l,m} \end{bmatrix} =$$

Equation 4

$$\begin{cases} \begin{bmatrix} e^{j\overline{\theta}_1^{n,\kappa(k)}} & 0 \\ 0 & e^{j\overline{\theta}_1^{n,\kappa(k)}} \end{bmatrix} \begin{bmatrix} c_{1,X}^{l,m}\cos(\alpha_X^{l,m}+\beta_{XX}^{l,m}) & 1 \\ c_{2,X}^{l,m}\cos(-\alpha_X^{l,m}+\beta_X^{l,m}) & -1 \end{bmatrix}, & m < resBands_X \\ \begin{bmatrix} e^{j\overline{\theta}_{n,\kappa(k)}} & 0 \\ 0 & e^{j\overline{\theta}_1^{n,\kappa(k)}} \end{bmatrix} \begin{bmatrix} c_{1,X}^{l,m}\cos(\alpha_X^{l,m}+\beta_X^{l,m}) & c_{1,X}^{l,m}\sin(\alpha_X^{l,m}+\beta_X^{l,m}) \\ c_{2,X}^{l,m}\cos(-\alpha_X^{l,m}+\beta_X^{l,m}) & c_{2,X}^{l,m}\sin(-\alpha_X^{l,m}+\beta_X^{l,m}) \end{bmatrix}, & \text{otherwise} \end{cases}$$

In one or more embodiment, the up-mixing unit 307 may up-mix a decoded residual signal and mono signal based on the up-mixing matrix of Equation 4, and may thereby perform a phase synthesis. In Equation 4, the resBand may denote a band where the residual signal is to be encoded.

Thus, the matrix calculator 306 may further calculate an up-mixing matrix of the below Equation 5, for example, based on the estimated OPD, e.g., based on Equation 3.

$$\begin{bmatrix} H11_{OTT_X}^{l,m} & H12_{OTT_X}^{l,m} \\ H21_{OTT_X}^{l,m} & H22_{OTT_X}^{l,m} \end{bmatrix} =$$

Equation 5

$$\begin{cases} \begin{bmatrix} e^{j\overline{\theta}_1^{n,\kappa(k)}} \cdot c_{1,X}^{l,m}\cos(\alpha_X^{l,m}+\beta_X^{l,m}) & 1 \\ e^{j\overline{\theta}_2^{n,\kappa(k)}} \cdot c_{2,X}^{l,m}\cos(-\alpha_X^{l,m}+\beta_X^{l,m}) & -1 \end{bmatrix}, & m < resBands_X \\ \begin{bmatrix} e^{j\overline{\theta}_1^{n,\kappa(k)}} \cdot c_{1,X}^{l,m}\cos(\alpha_X^{l,m}+\beta_X^{l,m}) & c_{1,X}^{l,m}\sin(\alpha_X^{l,m}+\beta_X^{l,m}) \\ e^{j\overline{\theta}_2^{n,\kappa(k)}} \cdot c_{2,X}^{l,m}\cos(-\alpha_X^{l,m}+\beta_X^{l,m}) & c_{2,X}^{l,m}\sin(-\alpha_X^{l,m}+\beta_X^{l,m}) \end{bmatrix}, & \text{otherwise} \end{cases}$$

According to Equation 5, the up-mixing unit 307 may up-mix the decoded residual signal and mono signal, based on the calculated up-mixing matrix, for example. The phase synthesis may be applied to the decoded mono signal, and a final up-mixed stereo signal may be generated based on the decoded residual signal.

The terms $\alpha_X^{l,m}$ and $\beta_X^{l,m}$ in Equation 4 and Equation 5 may be determined based on the below Equation 6, for example.

$$\alpha_X^{l,m} = \frac{1}{2}\arccos(\rho_X^{l,m})$$

Equation 6

$$\beta_X^{l,m} = \arctan\left(\tan(\alpha_X^{l,m})\frac{c_{2,X}^{l,m}-c_{1,X}^{l,m}}{c_{2,X}^{l,m}+c_{1,X}^{l,m}}\right)$$

Additionally, here, the term $\rho_X^{l,m}$ may be determined based on the below Equation 7, for example.

$$\rho_X^{l,m} =$$

Equation 7

$$\begin{cases} \max\left\{ICC_X^{l,m}, \lambda_0\left(10^{\frac{CLD_X^{l,m}}{20}}+10^{\frac{-CLD_X^{l,m}}{20}}\right)\right\}, & m < resBands_X \\ ICC_X^{l,m}, & \text{otherwise} \end{cases}$$

-continued $$\lambda_0 = -11/72$$

$$0 \leq m < M_{proc}, 0 \leq l < L$$

In this example, the up-mixing unit 307 may up-mix the decoded residual signal and mono signal based on the below Equation 8, for example, using the up-mixing matrixes of Equations 4 and 5, to generate the up-mixed stereo signal.

$$\begin{bmatrix} y_0^{l,m} \\ y_1^{l,m} \end{bmatrix} = H\begin{bmatrix} x^{l,m} \\ q^{l,m} \end{bmatrix} = \begin{bmatrix} H11_{OTT_X}^{l,m} & H12_{OTT_X}^{l,m} \\ H21_{OTT_X}^{l,m} & H22_{OTT_X}^{l,m} \end{bmatrix}\begin{bmatrix} x^{l,m} \\ q^{l,m} \end{bmatrix}$$

Equation 8

Here, x may denote the decoded mono signal in a QMF domain and q may denote the decoded residual signal. As noted above, when the residual signal does not exist, e.g., has not been transmitted or is not otherwise desireable or available, a separate signal generated through the aforementioned decorrelator may be used.

In one or more embodiments, the up-mixing matrixes of FIG. 4 may be applicable to a one-to-two (OTT) module of an MPEG-surround, and may be easy to be applied to multiple channels. Further, though only an example of a single up-mixing OTT module may have been discussed above, having a single input mono signal and a potentially single input residual signal, as there may be multiple down-mixing modules and multiple corresponding up-mixing modules for a multiple channel signal encoding/decoding, there may also be plural residual signals generated and potentially transmitted between a multi-tiered encoder and a multi-tiered decoder. There may equally be one or more respective parameters transmitted for one or more of the multi-tiered encoder/ decoder down-mixing/up-mixing modules, with potentially not all down-mixing/up-mixing modules performing the above noted down-mixing/up-mixing based on respective estimated phase information and residual information.

Figure 5:
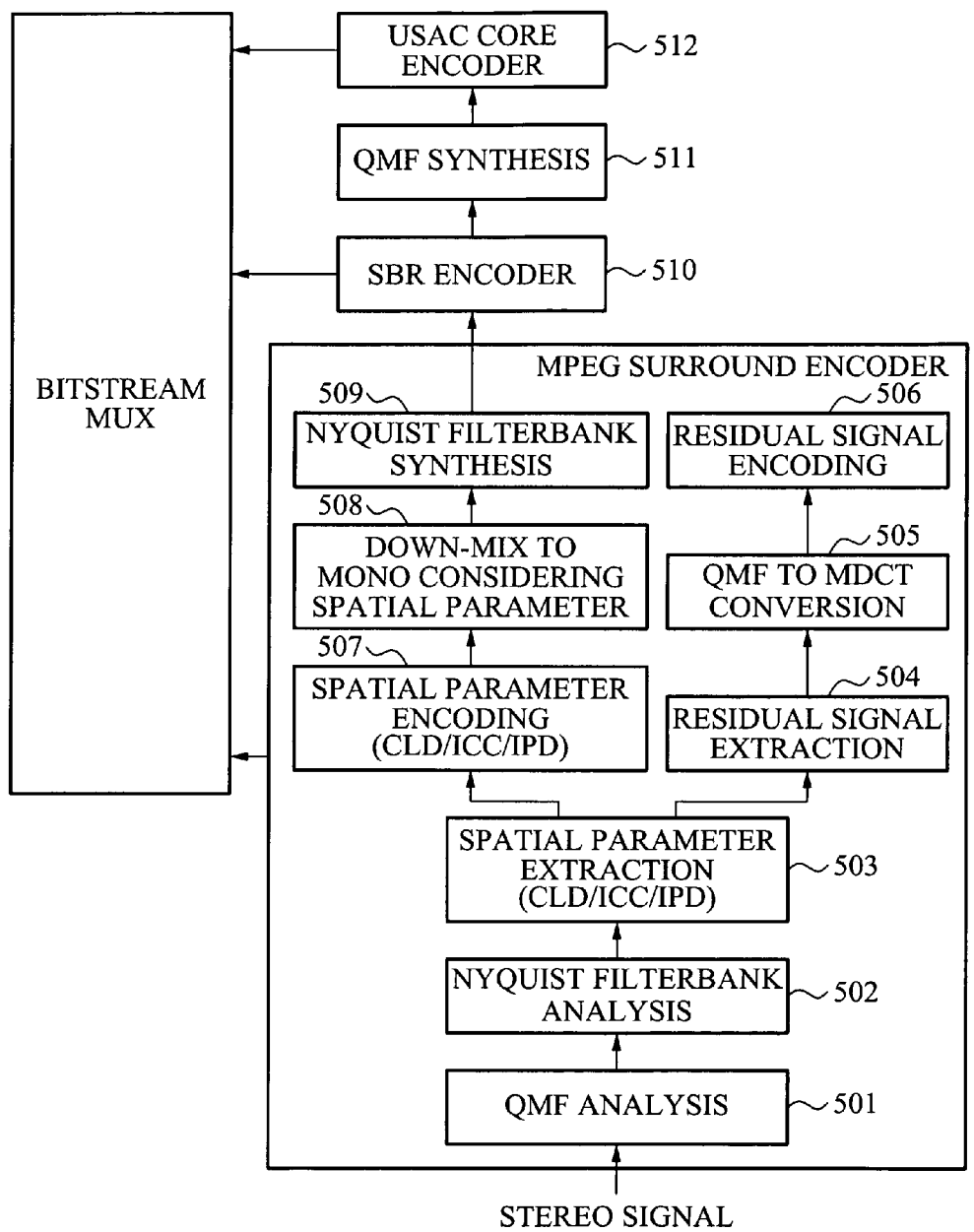
FIG. 5 is a diagram illustrating an encoding process, according to one or more embodiments.

FIG. 5 illustrates an encoding process, according to one or more embodiments. Here, though FIG. 5 has been illustrated as a flow chart for an encoding process, one or more embodiments may include an apparatus having one or more separate units to respectively implement such separately described processes, i.e., FIG. 5 may also be considered an illustration of an encoding apparatus and is further not limited to the encoding apparatus 201 of FIG. 2. Below, FIG. 5 will be described as a number of processes for encoding audio signals, with a presumption of an input signal being a stereo signal, i.e., having two channel signals.

QMF analysis with respect to an input stereo signal may be performed in operation 501, and a Nyquist filterbank analysis with respect to the stereo signal may be performed in operation 502 to transforms the stereo signal into a sub-sample. One or more spatial parameters with respect to the stereo signal, which has been transformed into the sub-sample, may be extracted in operation 503. A bit stream may then be generated by performing quantization and lossless encoding with respect to one or more extracted spatial parameters.

Down-mixing of the stereo signal into a mono signal may be performed in operation 508 based on the one or more extracted spatial parameters. The mono signal may further be transformed into a QMF domain based on a Nyquist filterbank synthesis, in operation 509.

Accordingly, a residual signal that may be considered an error signal may be generated when the stereo signal is expressed by the one or more extracted spatial parameters, in operation 504. An MDCT with respect to the extracted residual signal may be performed in operation 505, and encoding may be performed to generate a bit stream, in operation 506. In this example, the residual signal may be encoded in an MDCT domain based on an MPEG AAC, as only an example.

Here, operations 501 through 508 may be performed in an MPEG surround encoder, for example. Such an MPEG surround encoder may include a parameter encoder, such as the parameter encoder 202, the down-mixing unit 203, and the residual signal encoder 204 of FIG. 2.

Additionally, SBR encoding with respect to the mono signal, which has been transformed into the QMF domain, may be performed in operation 510, the mono signal may be transformed into a time domain using QMF synthesis in operation 511, and USAC core encoding may be performed in operation 512, thereby generating a bit stream of the mono signal. Here, operation 510 may be performed in an SBR encoder and operation 512 may be performed in a USAC core encoder, for example. Such a USAC core encoder may include the channel signal encoder 205 of FIG. 2.

Figure 6:
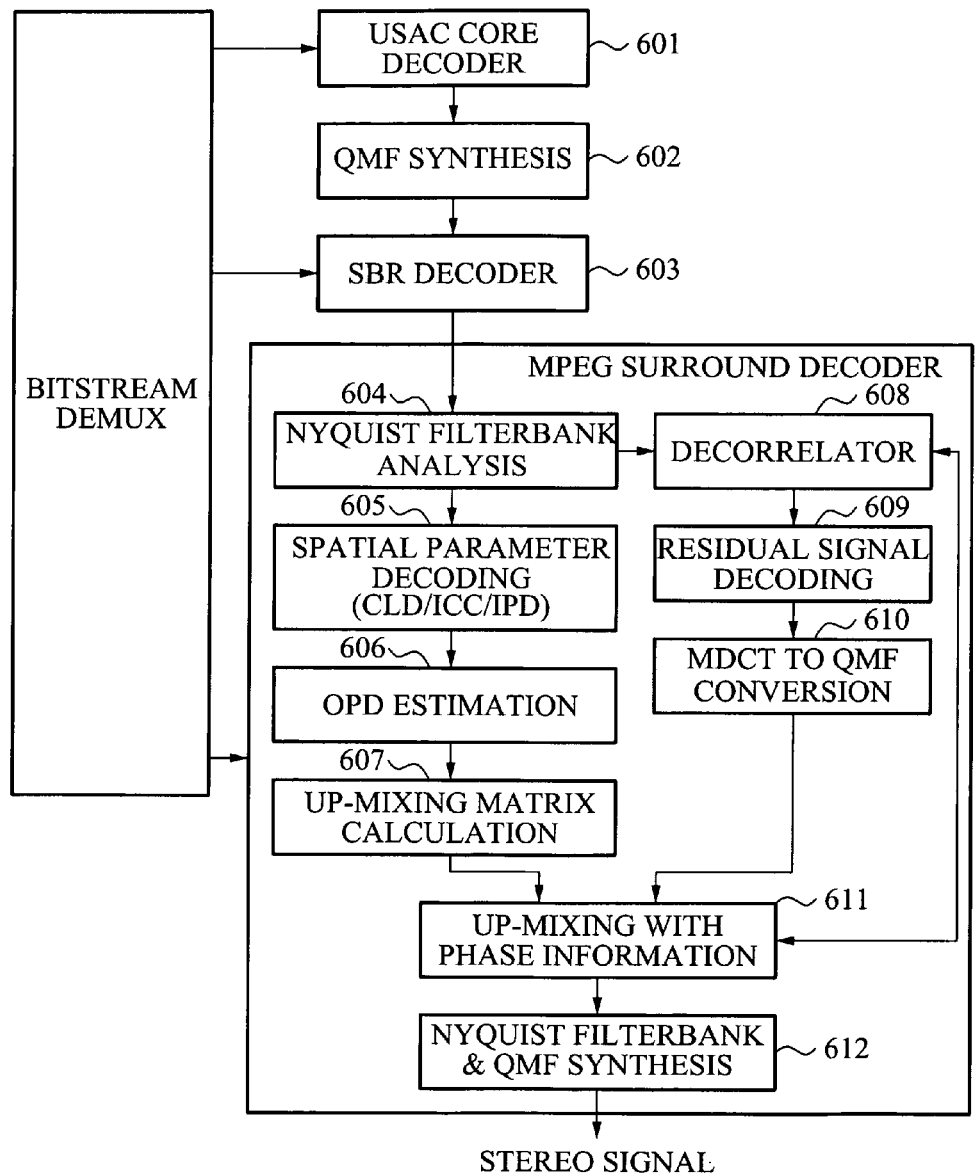
FIG. 6 is a diagram illustrating a decoding process, according to one or more embodiments.

FIG. 6 illustrates a decoding process, according to one or more embodiments. Here, though FIG. 6 has been illustrated as a flow chart for a decoding process, one or more embodiments may include an apparatus having one or more separate units to respectively implement such separately described processes, i.e., FIG. 6 may also be considered an illustration of a decoding apparatus and is further not limited to the decoding apparatus 301 of FIG. 3. Below, FIG. 6 will be described as a number of processes for decoding audio signals, with a presumption of an encoded signal being a mono signal representing an encoded stereo signal, i.e., having two channel signals.

A mono signal may be decoded from a bit stream, based on a USAC core decoding, in operation 601, as only an example.

In one or more embodiments, the mono signal may alternatively be decoded based on one of an ACELP, a wLPT, and the AAC, for example.

The mono signal, in a time domain, may be transformed into a sub-band signal, based on a QMF analysis, in operation 602. SBR decoding with respect to the mono signal, which has been transformed into the sub-band, may further be performed in operation 603. The operation 601 may be performed by a USAC core decoder, such as the channel signal decoder 302 of FIG. 3, and operation 603 may be performed by an SBR decoder.

A Nyquist filterbank analysis may be applied to the SBR decoded mono signal in operation 604. One or more spatial parameters may further be decoded from the bit stream in operation 605, and an OPD, which is phase information, may be estimated in operation 606. An up-mixing matrix may then be calculated based on the estimated OPD in operation 607.

A residual signal may be decoded from the bit stream in operation 609. The residual signal, in an MDCT domain, may be transformed to a QMF domain in operation 610. Up-mixing of the mono signal and the decoded residual signal may then be performed based on the calculated up-mixing matrix in operation 611. In one or more embodiments, when the residual signal is not included in the bit stream or not otherwise available (or deemed available), an appropriate predetermined signal may be generated using a decorrelator in operation 608, and the mono signal and the predetermined signal may be up-mixed based on the calculated up-mixing matrix. The Nyquist filterbank analysis and a QMF synthesis to restore a stereo signal of the time domain may then be performed in operation 612.

Operations 604 through 612 may be performed by an MPEG surround decoder, and such an MPEG surround decoder may include the parameter decoder 303, the phase information estimating unit 304, the residual signal decoder 305, the matrix calculator 306, and the up-mixing unit 307 of FIG. 3, for example.

Figure 7:
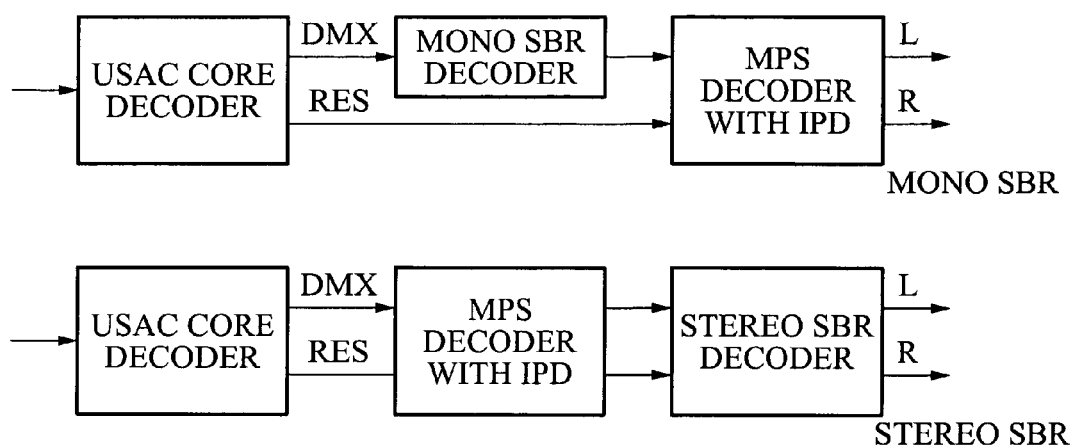
FIG. 7 is a diagram illustrating a decoding order, according to one or more embodiments.

FIG. 7 illustrates a decoding order, according to one or more embodiments.

Referring to FIG. 7, there is provided a signaling method while a decoding is being performed. Similar to above, though FIG. 7 may illustrate a signaling method, one or more embodiments may include an apparatus having one or more separate units to respectively implement such separately described processes, i.e., FIG. 7 may also be considered an illustration of a decoding apparatus. Below, FIG. 7 will be described as a number of processes for decoding audio signals.

According to an embodiment, basic information used to perform decoding may be expressed, based on a following syntax of USACSpecificConfig( ), for example, as a header and may be included in a encoded bit stream, as follows:

| Syntax of USACSpecificConfig( ) | No. of bits | Mnemonic |
|---|---|---|
| USACSpecificConfig (samplingFrequencyIndex, channelConfiguration, audioObjectType) { | | |
| frameLengthFlag; | 1 | bslbf |
| dependsOnCoreCoder; | 1 | bslbf |
| extensionFlag; | 1 | bslbf |
| if (extension Flag) { | | |
|    extensionFlag3; | 1 | bslbf |
|    tw_mdct; | 1 | bslbf |
|    noiseFilling; | 1 | bsblf |
|    If (sbrPresentFlag == 1) { | | |
|       harmonicSBR; | 1 | bsblf |

-continued

| Syntax of USACSpecificConfig( ) | No. of bits | Mnemonic |
|---|---|---|
| } | | |
|   mpegsMuxMode; | 2 | uimsbf |
|   if ( mpegsMuxMode > 0 ) { | | |
|     if (channelConfiguration == 2) { | | |
|       bsStereoSbr; | 1 | uimsbf |
|       bsPseudoLr; | 1 | uimsbf |
|     } | | |
|     tmpBits = SpatialSpecificConfig( ); | | |
|   } | | |
| } | | |
| } | | |

In this example, the elements bsStereoSbr and bsPseudoLr may be elements to perform coding of a residual signal, for example.

The element bsStereoSbr may be a flag that signals the usage of the stereo SBR in combination with MPEG Surround decoding.

The element bsStereoSbr may also be defined by the below Table 1, for example. A decoding order shown in FIG. 7 may also be determined by the element bsStereoSbr, for example.

TABLE 1

| bsStereoSbr | Meaning |
|---|---|
| 0 | Mono SBR |
| 1 | Stereo SBR |

The element bsStereoSbr is information that may indicate a location of a spectral band replication (SBR) module that may be able to be combined with an MPEG surround module and a number of channels. When a mono SBR is applied, a down-mix signal may be input, SBR decoding may be performed, and an MPEG surround stereo may be decoded. When a stereo SBR is applied, the MPEG surround stereo may be decoded and SBR decoding may be performed and thus, a final stereo signal may be restored.

Here, the element bsPseudoLr may be a flag that signals that an inverse mid/side rotation should be applied to the core signal prior to MPEG Surround processing.

The element bsPseudoLr may also be defined by the below Table 2, for example.

TABLE 2

| bsPseudoLr | Meaning |
|---|---|
| 0 | USAC Core decoder output is down-mix signal & residual signal |
| 1 | Core decoder output is Pseudo L/R |

The element channelConfiguration may indicate a number of channels of a USAC core encoder. In an embodiment, according to Syntax of USACSpecificConfig( ), when the USAC core encoder is encoded into two channel signals which are stereo signals, signaling may be performed with respect to an SBR configuration. However, a USAC technology that adopts an MPEG surround may support a 5-2-5 tree structure and a 7-2-7 tree structure, for example. In this example, channelConfiguration may be transmitted as '2'. In this example, the corresponding SBR configuration may not be defined by bsStereoSbr, to up-mix to a 5.1 channel signal. When the SBR is applied in the 5-2-5 and the 7-2-7 structures, a down-mixed signal may be applied to the SBR first and then the up-mixing may be performed to generate multiple channel signals.

Accordingly, in an embodiment, syntax of USACSpecificConfig( ) may be corrected as below.

In one or more embodiments, the syntax of USACSpecificConfig( ) may be corrected according to the below modified syntax of USACSpecificConfig( ), as follows:

| Modified Syntax of USACSpecificConfig( ) | No. of bits | Mnemonic |
|---|---|---|
| USACSpecificConfig (samplingFrequencyIndex, | | |
|     channelConfiguration, | | |
|     audioObjectType) | | |
| { | | |
|   frameLengthFlag; | 1 | bslbf |
|   dependsOnCoreCoder; | 1 | bslbf |
|   extensionFlag; | 1 | bslbf |
|   if (extension Flag) { | | |
|     extensionFlag3; | 1 | bslbf |
|     tw_mdct; | 1 | bslbf |
|     noiseFilling; | 1 | bsblf |
|     If (sbrPresentFlag == 1) { | | |
|       harmonicSBR; | 1 | bsblf |
|     } | | |
|     mpegsMuxMode; | 2 | uimsbf |
|     if ( mpegsMuxMode > 0 ) { | | |
|       tmpBits = SpatialSpecificConfig( ); | | |
|       if (bsTreeConfig == 0x7) { | | |
|         bsStereoSbr; | 1 | uimsbf |
|         bsPseudoLr; | 1 | uimsbf |
|       } | | |
|     } | | |
|   } | | |
| } | | |

According to a Modified Syntax of USACSpecificConfig( ), SpatialSpecificConfig( ) may be interpreted first, and the elements bsStereoSbr and bsPseudoLr may be transmitted based on an obtained bsTreeConfig. Therefore, the modified syntax of USACSpecificConfig( ) may be compatible with the existing 5-2-5 and 7-2-7 structures. When bsTreeConfig is 0x07, it may indicate a 2-1-2 structure, which may indicate the generating of a stereo signal.

Encoding of a residual signal may be applied to a high bit rate and thus, decoding may be selectively performed based on bs212Mode indicating a bitrate mode of the MPEG surround, for example. In one or more embodiments, the residual signal may be selectively decoded based on bsResidualCoding information, and the modified syntax of USACSpecificConfig( ) can be seen as shown below:

| Modified Syntax of USACSpecificConfig( ) | No. of bits | Mnemonic |
|---|---|---|
| USACSpecificConfig (samplingFrequencyIndex, | | |
|     channelConfiguration, | | |
|     audioObjectType) | | |
| { | | |
|   frameLengthFlag; | 1 | bslbf |
|   dependsOnCoreCoder; | 1 | bslbf |
|   extensionFlag; | 1 | bslbf |
|   if (extension Flag) { | | |
|     extensionFlag3; | 1 | bslbf |
|     tw_mdct; | 1 | bslbf |
|     noiseFilling; | 1 | bsblf |
|     If (sbrPresentFlag == 1) { | | |
|       harmonicSBR; | 1 | bsblf |
|     } | | |
|     mpegsMuxMode; | 2 | uimsbf |
|     if ( mpegsMuxMode > 0 ) { | | |
|       tmpBits = SpatialSpecificConfig( ); | | |
|       if (bsTreeConfig == 0x7 && bs212Mode==1 && bsResidualCoding==1) { | | |
|         bsStereoSbr; | 1 | uimsbf |
|         bsPseudoLr; | 1 | uimsbf |
|       } | | |

-continued

| Modified Syntax of USACSpecificConfig( ) | No. of bits | Mnemonic |
|---|---|---|
| } | | |
| } | | |
| } | | |

As only an example, the element bs212Mode may indicate an operation mode of SpatialFrame( ) according to bsStereoSbr being defined by the below Table 3.

TABLE 3

| bs212Mode | bit rate mode |
|---|---|
| 0 | LOW |
| 1 | HIGH |

In one or more embodiments, the above condition may be determined based on one of the elements bsTreeConfig, bs212Mode, and bsResidualCoding, for example.

In one or more embodiments, apparatus, system, module, and unit descriptions, as only examples, herein may include one or more hardware processing elements. For example, each described apparatus, unit, or modules, as non-limiting examples, may include one or more processing devices, i.e., elements, to perform the described operation, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing element, i.e., device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The apparatus, units, modules, or computer-readable media, as non-limiting examples, may also be embodied in at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An audio encoding method, comprising:
    extracting one or more spatial parameters associated with phase information of N audio channel signals and to encode the extracted one or more spatial parameters including an inter-channel phase difference (IPD) parameter;
    down-mixing the N audio channel signals into M channel signals, based on the extracted one or more spatial parameters;
    encoding a residual signal associated with the N audio channel signals based on the down-mixed M channel signals;
    encoding the M channel signals; and
    outputting the encoded residual signal and the encoded M channel signals,
    wherein the down-mixing of the N audio channel signals into the M channel signals is performed so that when the encoded M channel signals are up-mixed, by a decoder, the up-mixing is based a decoding of the encoded one or more spatial parameters, including a decoded IPD parameter, and an estimated overall phase difference (OPD) parameter estimated by the decoder based on the decoded one or more spatial parameters.

2. The audio encoding method of claim 1, further comprising:
    encoding a first flag that signals whether stereo spectral band replication (SBR) is used in the encoding of the M channel signals, so a decoder may selectively decode the encoded M channel signals, received from a bistream, by using SBR based on the decoder decoding the first flag, received from the bitstream, and a determination of whether the decoded first flag signals that SBR is used in the encoding of the M channel signals.

3. The audio encoding method of claim 2, wherein the first flag signals whether the stereo SBR in combination with MPEG surround (MPS) is used in the encoding of the M channel signals.

4. The audio encoding method of claim 3, further comprising determining an encoding order, in the encoding of the M channel signals, between SBR encoding and MPS encoding.

5. The audio encoding method of claim 3, further comprising encoding a second flag indicating whether an inverse mid/side rotation is performed, in the encoding of the M channel signals, after SBR encoding and MPS encoding.

6. An audio encoding method, comprising:

extracting spatial parameters for N audio channel signals and encoding one or more of the extracted spatial parameters including a phase difference parameter;

down-mixing the N audio channel signals into M channel signals;

encoding a residual signal for the M audio channels; and encoding the M channel signals, wherein the down-mixing of the N audio channel signals into the M channel signals is performed so a decoder can up-mix a decoding of the encoded M channel signals, received from a bitstream, based on a decoding of the residual signal, received from the bitstream, and an up-mixing matrix, with the up-mixing matrix being based on a result of a decoding by the decoder of the encoded spatial parameters, including the phase difference parameter, and an estimation of a different phase difference parameter by the decoder based on the decoded spatial parameters, wherein the different phase difference parameter is different from the decoded spatial parameters.

7. An audio encoding method, comprising:

extracting spatial parameters for plural audio channel signals and encoding one or more of the extracted spatial parameters;

down-mixing the plural audio channel signals to generate a down-mixed mono signal; and encoding the down-mixed mono signal, wherein the down-mixing of the plural audio channel signals into the down-mixed mono signal is performed so a decoder can up-mix a decoding of the encoded down-mixed mono signal, received from a bitstream, with the up-mixing being based on a decoding of the encoded spatial parameters, received from the bitstream, and an estimation, by the decoder, of a spatial parameter representing phase information between a left audio channel signal, of the plural audio channel signals, and the down-mixed mono signal, wherein the estimation of the spatial parameter representing phase difference is based on the decoded spatial parameters and different from the decoded spatial parameters.

8. The audio encoding method of claim 7, wherein the encoded spatial parameters comprise an inter-channel phase difference (IPD) spatial parameter and a channel level difference (CLD) spatial parameter, such that the estimating, by the decoder, of the spatial parameter representing the phase information between the left audio channel signal and the down-mixed mono signal is based on the IPD and the CLD.

9. The audio encoding method of claim 7, wherein the down-mixing of the plural audio channel signals is performed so a decoder can up-mix a decoding of the encoded down-mixed mono signal, received from a bitstream, based on an up-mixing matrix, with the up-mixing matrix being based on the estimated spatial parameter representing phase information between the left audio channel signal and the down-mixed mono signal.

* * * * *

UNITED STATES PATENT AND TRADEMARK OFFICE
CERTIFICATE OF CORRECTION

| | | |
|---|---|---|
| PATENT NO. | : 8,948,404 B2 | |
| APPLICATION NO. | : 12/926054 | |
| DATED | : February 3, 2015 | |
| INVENTOR(S) | : Jung Hoe Kim et al. | |

It is certified that error appears in the above-identified patent and that said Letters Patent is hereby corrected as shown below:

Title page

First Page, Second Column, OTHER PUBLICATIONS, Line 2

Delete "Standaradisation" and insert --Standardisation--, therefor.

Claims

Claim 2, Column 16, Line 52

Delete "bistream," and insert --bitstream,--, therefor.

Signed and Sealed this
Thirteenth Day of October, 2015

Michelle K. Lee
*Director of the United States Patent and Trademark Office*